United States Patent [19]

Levionnais

[11] Patent Number: 5,083,013
[45] Date of Patent: Jan. 21, 1992

[54] SYSTEM FOR REMOTE INFORMATION INTERCHANGE BETWEEN A PORTABLE OBJECT AND A STATION

[75] Inventor: Philippe Levionnais, Caen, France

[73] Assignee: Etat Francais, Ministre des Postes, des Télécommunications et de l'Espace (Centre National D'Etudes Des Telecommunications), Issy-Les Moulineaux, France

[21] Appl. No.: 452,633

[22] Filed: Dec. 18, 1989

[30] Foreign Application Priority Data

Dec. 16, 1988 [FR] France ................................ 88 16672

[51] Int. Cl.⁵ .............................................. G06K 7/08
[52] U.S. Cl. .................................... 235/449; 235/493; 331/64
[58] Field of Search ............... 235/449, 492, 493, 439, 235/441, 380; 331/64; 324/327, 328

[56] References Cited

U.S. PATENT DOCUMENTS

| | | | |
|---|---|---|---|
| 2,393,717 | 1/1946 | Speaker | 324/328 X |
| 4,029,945 | 6/1977 | Yamada et al. | 235/439 X |
| 4,650,981 | 3/1987 | Foletta | 235/492 X |
| 4,782,308 | 11/1988 | Trobec et al. | 235/380 X |
| 4,918,416 | 4/1990 | Walton et al. | 235/493 |
| 4,960,983 | 10/1990 | Inoue | 235/493 X |

Primary Examiner—David Trafton
Attorney, Agent, or Firm—Toren, McGeady & Associates

[57] ABSTRACT

The station, in particular a terminal, comprises an oscillator (OS) having a feedback loop (1) and a station inductor element (L10) suitable for conferring a working frequency to the oscillator which varies relative to a rest frequency. The station also includes a station processor connected to the oscillator and capable of processing variations in the working frequency of the oscillator. The portable object, in particular a memory card, includes an electronic circuit which is switchable between an inactive state and an active state in which it sets up a resonant circuit tuned on a frequency which is distinct from the rest frequency while remaining suitable for being coupled inductively with the feedback loop (1) at the rest frequency. The portable object also includes an object processor capable of switching the electronic circuit as a function of the information to be transmitted to the station. The variation in the operating frequency of the oscillator as induced in this way by the switching enables the station processor to deduce the information.

28 Claims, 4 Drawing Sheets

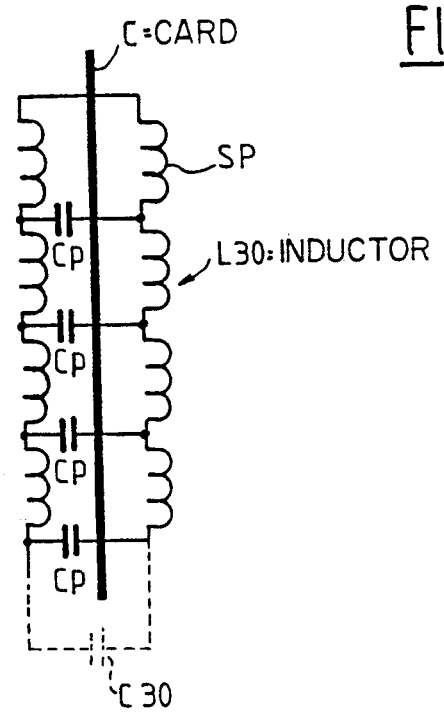
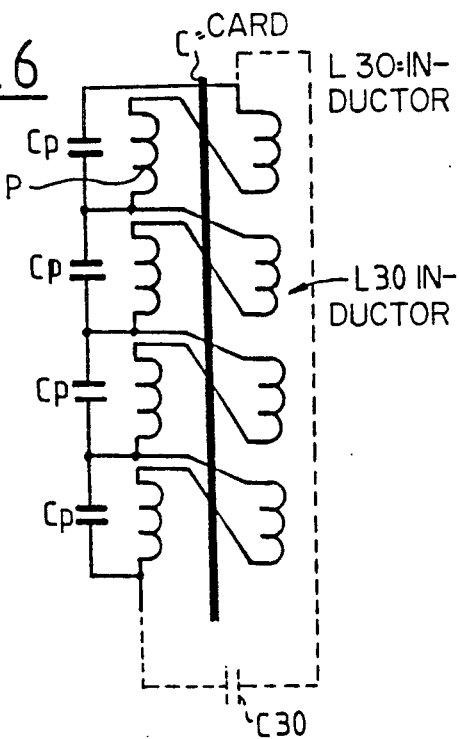
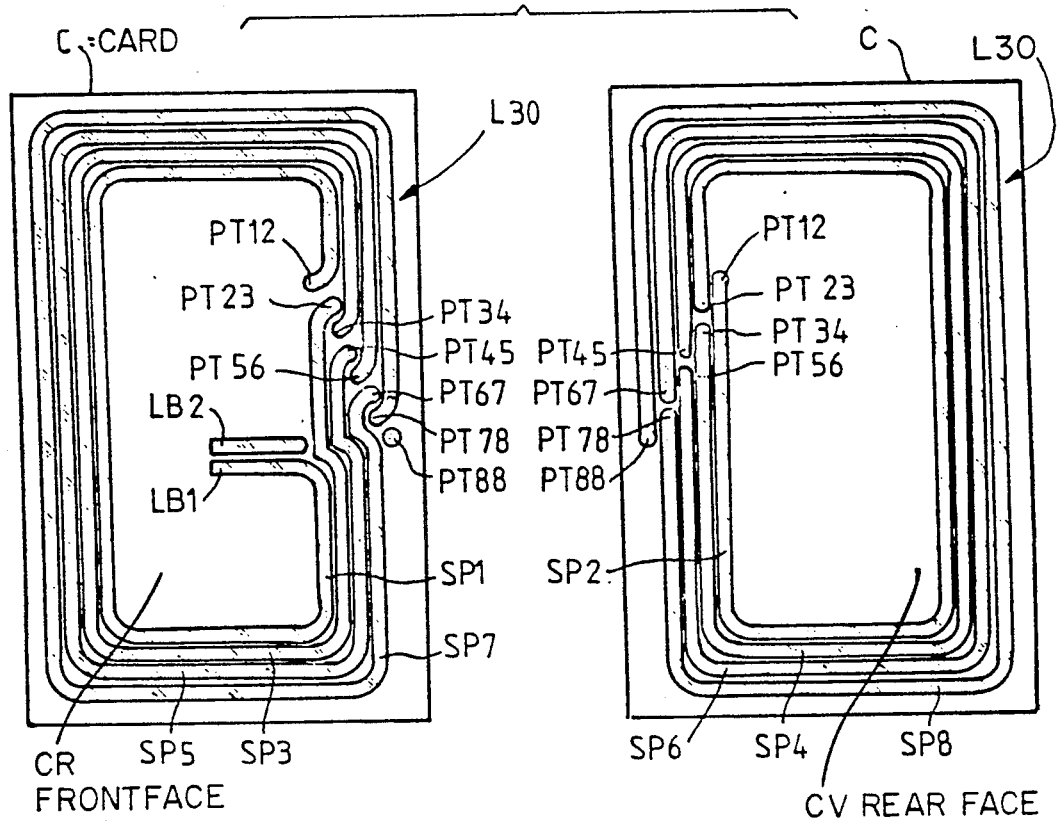

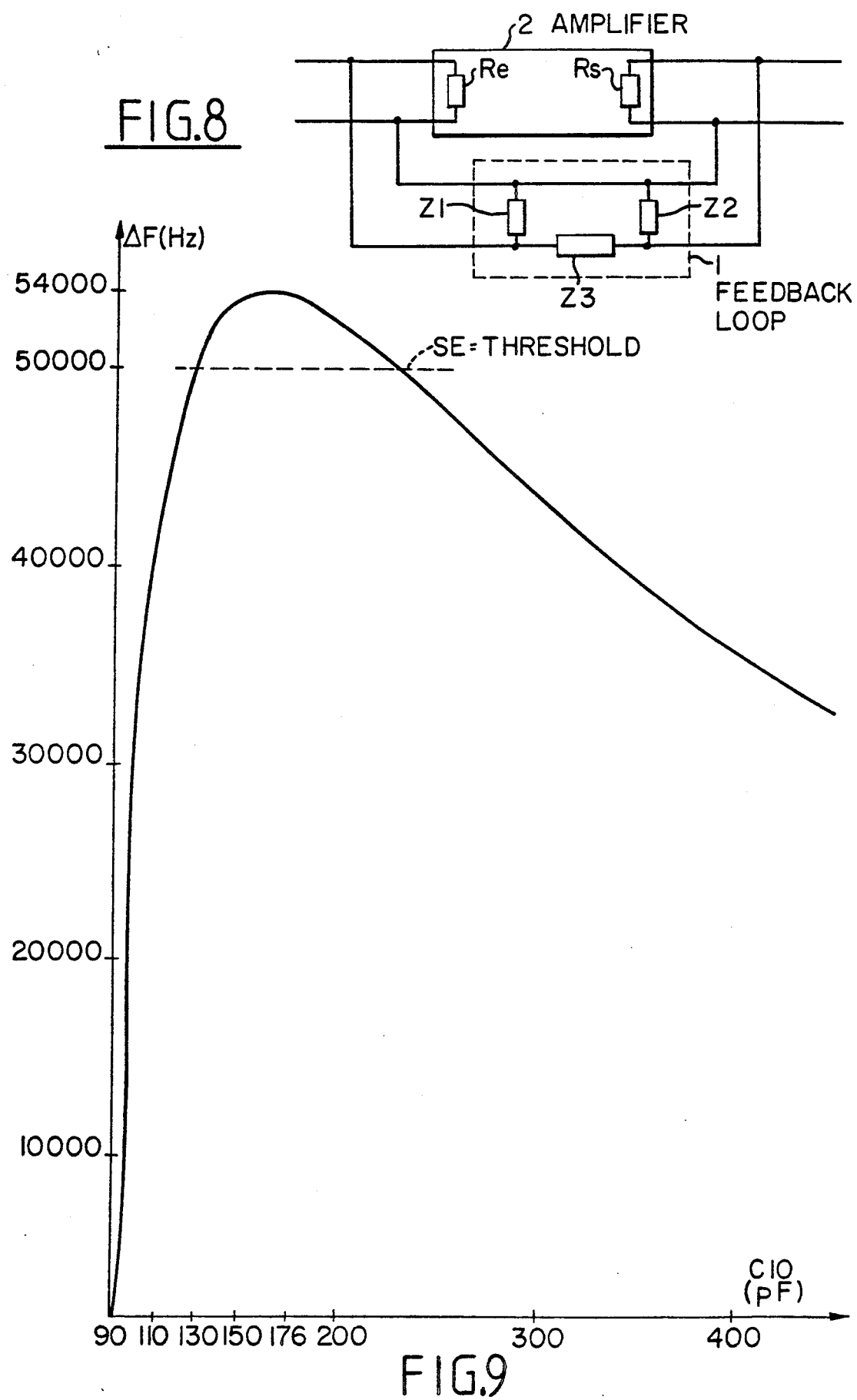

SYSTEM FOR REMOTE INFORMATION INTERCHANGE BETWEEN A PORTABLE OBJECT AND A STATION

The invention relates to remote information interchange between a portable object and a station. It is particularly, but not exclusively, applicable to interchanging information between a terminal and an electronic memory card, commonly called a "smart" card.

The concept of "remote" interchange is used herein to distinguish from interchange requiring an interface by making contact, electrical or otherwise, between the card and the terminal, as applied in payphones where payment is made by means of such a card.

BACKGROUND OF THE INVENTION

This type of interface may be considered as being relatively restricting in various applications, e.g. identifying people or controlling the access of particular people to a building. It may also be restricting in banking transactions that require the card to pass through a slot in the terminal.

That is why the Applicant seeks to provide a remote data interchange system suitable for use over different distances.

The person skilled in the art knows that the amplitude of an electromagnetic signal applied to the terminals of an inductive frame can be varied by coupling the frame inductively with a resonant circuit which is tuned to the frequency of the signal. Such variations are significant when the ratio between the area of the inductive elements of the resonant circuit and the area of the frame is not too great.

However, it is intended, particularly for remote banking transactions, that the bearer of a memory card fitted with a resonant circuit should pass through an inductive frame or "gate" and that information should be exchanged as the bearer is passing through. Unfortunately, the ratio of the area of such a gate (about 1.6 m$^2$) to the area of a standard memory card (about 40 cm$^2$) would give rise to amplitude variations which are too small to be indicative of the presence of a card in the gate, and which could possibly be interpreted as "noise". In addition, these variations depend on the physical characteristics (e.g. volume) of the person present in the gate, which means that the variations are insufficiently stable to ensure adequate reliability for information interchange during banking transactions, for example.

The invention seeks to provide a solution to this problem.

An object of the invention is to cause an electromagnetic signal at the terminals of an inductive frame or "gate" to vary during remote inductive coupling with a portable object such as a memory card in a manner which is indicative of the presence of the card in the gate.

Another object of the invention is to escape from interfering variations due, in particular, to the physical characteristics of the people carrying such memory cards.

Another object of the invention is to ensure that information is transmitted reliably between the portable object and the station.

Another important object of the invention is to enable remote two-way interchange to take place between the portable object and the station.

The invention also seeks to provide a device which consumes practically no energy when transmitting or when receiving information, and which does so at very low cost.

SUMMARY OF THE INVENTION

The present invention provides:
at the station: both an oscillator including a feedback loop having a station inductor element therein and suitable for conferring a working frequency thereto which is variable relative to a rest frequency; and also station processor means connected to the oscillator and capable of processing variations in the working frequency; and
at the portable object: both an electronic circuit which is switchable between an inactive state and an active state in which it constitutes a resonant circuit tuned to a frequency different from said rest frequency while remaining suitable for inductive coupling with the feedback loop at said rest frequency; and also object processor means capable of switching the electronic circuit as a function of the information to be transmitted to the station, with the variations in the working frequency of the oscillator induced by such switching enabling the station processor means to deduce said information.

It should be observed at this point that the invention relies in part on using an oscillator in an unusual manner. The person skilled in the art knows that oscillators are normally used and adjusted to deliver a signal at a frequency which is as stable as possible. In contrast, in the present invention, as explained in greater detail below, an oscillator is chosen which has a feedback loop in which a change in one of the parameters gives rise to frequency variation in the signal produced by the oscillator. It is this frequency variation which is used for transmitting information from the portable object towards the station.

In one embodiment, the electronic circuit elements and the feedback loop elements are selected and arranged so that the frequency variation induced by the resonant circuit is greater than a predetermined threshold.

Advantageously, the oscillator comprises amplifier means and an oscillating circuit feedback loop possessing, for example, in addition to the station inductor element, two station capacitor elements.

Thus, in a particular advantageous embodiment, it is possible to use an oscillator which is of the "adapted Colpits" type, in which the working angular frequency of the oscillator is substantially equal to the reciprocal of the square root of the product of the inductance of the station inductor element multiplied by an overall capacitance which is substantially equal to the ratio of the product of the capacitances of the two station capacitor elements divided by the sum of said capacitances; the respective capacitances of the two station capacitor elements then advantageously being selected so as to maximize the frequency variation induced in the oscillator by switching the electronic circuit, and preferably being equal to twice said overall capacitance value.

It is advantageous for the input resistance of the amplifier means of the oscillator to be low. It is then possible to use oscillator amplifying means constituted by a common base connected transistor.

In one embodiment, the electronic circuit of the portable object includes an object inductor element and an object capacitor connected to each other in said active state to form the resonant circuit, together with switching means connected to one and/or the other of the two elements and suitable for switching the electronic circuit between its two states.

Generally, the station inductor element and the object inductor element each exhibit resistance. In the active state of the electronic circuit, the resonant circuit then induces an additional resistive term in the feedback loop dependant on the mutual induction coefficient between the station inductor element and the object inductor element, and also on the resistance of the object inductor element. It is then advantageous for the ratio of the additional resistance term divided by the resistance of the station inductor element to be greater than a selected value, e.g. about 50.

It is also advantageous for the object inductive element to be arranged to impart little stray capacitance to the resonant circuit. When the portable object is a card or the like, then the object inductor element may be constituted by an electrical conductor passing through the card to form a succession of turns situated alternately on the front face and on the rear face of the card.

In order to provide two-way interchange, the portable object may include reception means for receiving information transmitted from the station to the portable object, said means being switchable as a function of the transmitted information between a rest state and a working state in which they are coupled inductively with the reaction loop of the oscillator, together with analysis means for deducing the said transmitted information from said switching. It is then appropriate for the portable object to include its own electrical power supply means.

In a particularly advantageous embodiment, the reception means comprise said resonant circuit and additional switching means, such as a field effect transistor (FET) controlled by the resonant circuit to delivery binary data to the analysis means as a function of the state in which the reception means are to be found.

The invention also provides a station and a portable object for such a system.

BRIEF DESCRIPTION OF THE DRAWINGS

Embodiments of the invention are described by way of example with reference to the accompanying drawings, in which:

FIGS. 5 and 6 show two ways in which the object inductor element on the portable object can be wired;

FIG. 7 corresponds to FIG. 6 and shows one possible physical disposition of an object inductor element on the front and rear faces of a card;

FIG. 8 is an equivalent circuit for the oscillator of FIG. 2; and

FIG. 9 is an experimental curve confirming the choice of various components for use in the oscillator of a station in accordance with the invention.

DETAILED DESCRIPTION

The drawings include items which are definitive in nature. In this respect, they form an integral part of the description and may be used not only for facilitating understanding of the following description but also for contributing, where appropriate, to the definition of the invention.

Unless otherwise specified, the following description assumes that the portable objects is of the memory card type and that the station is a terminal fitted with an inductive gate through which a person carrying the memory card may pass. Naturally, as mentioned above, the invention is not limited in any way to this particular application.

Figure 1:
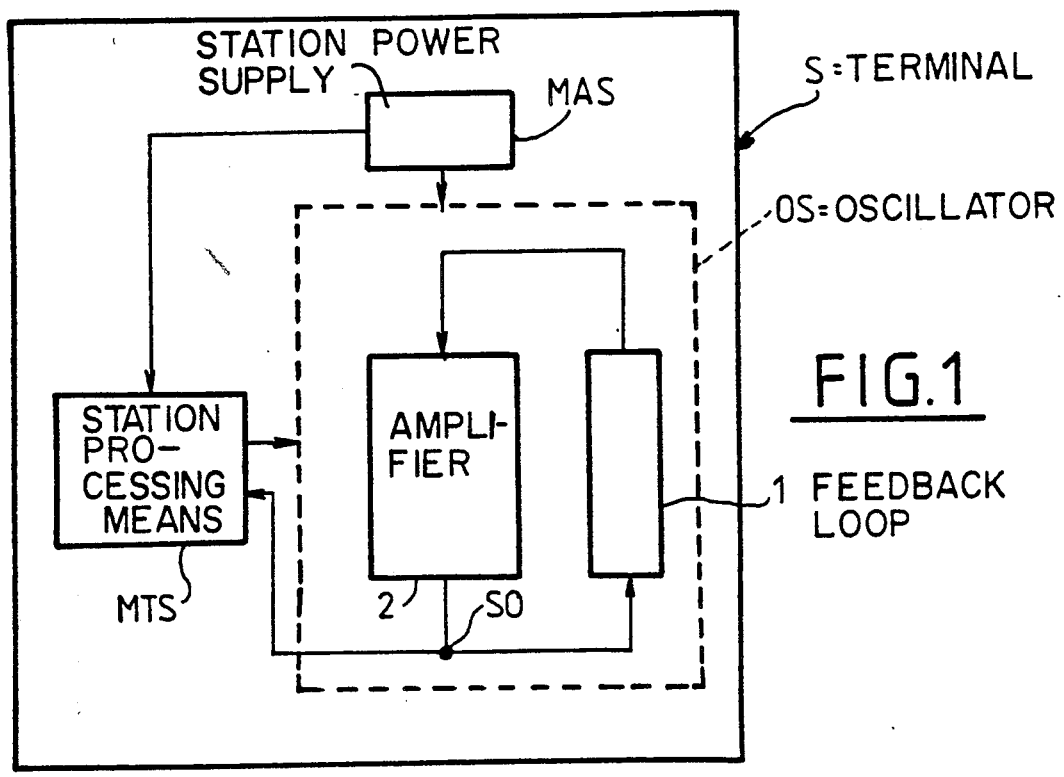
FIG. 1 is a very diagrammatic representation of one embodiment of a station in a system of the invention.

As shown in FIG. 1, the terminal S includes an oscillator OS comprising amplifier means 2 and a feedback loop 1 connecting the output SO of the amplifier means to the input thereof. As explained below, the arrangement and selection of the components of the feedback loop 1 confer a working frequency to this oscillator which is variable, with the variations in frequency being processed by station processing means MTS connected to the output SO of the amplifier means 2. These terminal components S are powered by station power supply means MAS.

Figure 2:
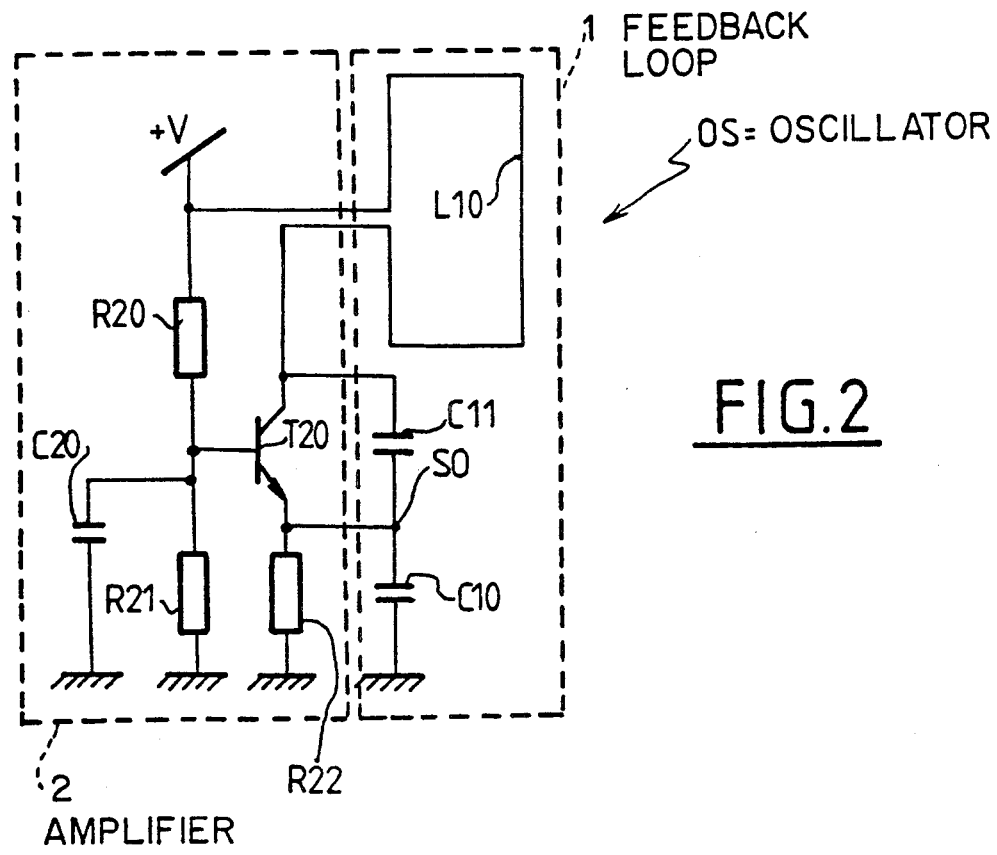
FIG. 2 is a simplified circuit diagram of an oscillator belonging to a station of the invention.

The person skilled in the art will see from FIG. 2 that the general structure of the oscillator OS is of the "Colpits" type as described, for example, at pages 273–276 of the book "ELECTRONIQUE DES SIGNAUX ANALOGIQUES" (Analog Signal Electronics) by Jean Auvray, published by Dunod Universite.

The amplifier means 2 comprise a common base connected transistor T20. This transistor may be of type 2N2222A as sold by the French firm RTC. The emitter of the transistor is connected to ground via a bias resistor R22 and its base is connected firstly via a bias resistor R20 to the voltage $+V$ as delivered by the power supply means MAS, and secondly to ground via a resistor R21 and a capacitor C20 connected in parallel with the resistor R21.

The feedback loop 1 comprises a station inductor element L10 and two capacitors C10 and C11, with these three elements constituting an oscillating circuit. The inductor element L10 is constituted by the gate through which a person carrying a card may pass, and is constituted by a rectangular tun having one terminal connected to the voltage $+V$ and having its other terminal connected to the collector of the transistor T20. The dimensions of the inductive frame L10 are those of a standard door, i.e. about 2 meters (m) high and about 80 cm wide. The card carrier can thus keep the card on the person without necessarily holding the card in the hand. The turn constituted in this way has an inductance of 6.7 micro-Henries ($\mu$H) and a resistance R10 equal to about 0.1 ohms ($\Omega$).

One of the two capacitors, referenced C11, is connected between the emitter and the collector of the transistor T20 and has a capacitance equal to about 56 picofarads (pF).

The second capacitor referenced C10, is connected between the emitter of transistor T20 and ground, across the terminals of resistor R22, and its capacitance is substantially equal to 150 pF.

However, the transistor T20 has its own stray capacitance. Thus, a first station capacitor element, likewise bearing the reference C11, is defined as being representative of the total capacitance between the emitter and the collector of the transistor T20, and a second station capacitor element, likewise referenced C10, is defined as being representative of the total capacitance between the emitter and ground.

The capacitances of the two capacitors are selected so that the actual capacitance of each station capacitor element is equal to about 176 pF.

When the frame L10 is not inductively coupled with a memory card, the oscillator produces a signal at a rest frequency $F_O$.

The capacitances selected for the two station capacitor elements C10 and C11 contribute to obtaining significant variation in the frequency of the signal produced by the oscillator when the frame L10 is inductively coupled with a memory card. Although the structure of the oscillator is generally that of a "Colpits" oscillator, it will nevertheless be referred to below as an "adapted Colpits" oscillator in order to recall this special and unusual property compared with the operation of a conventional oscillator.

Figure 3:
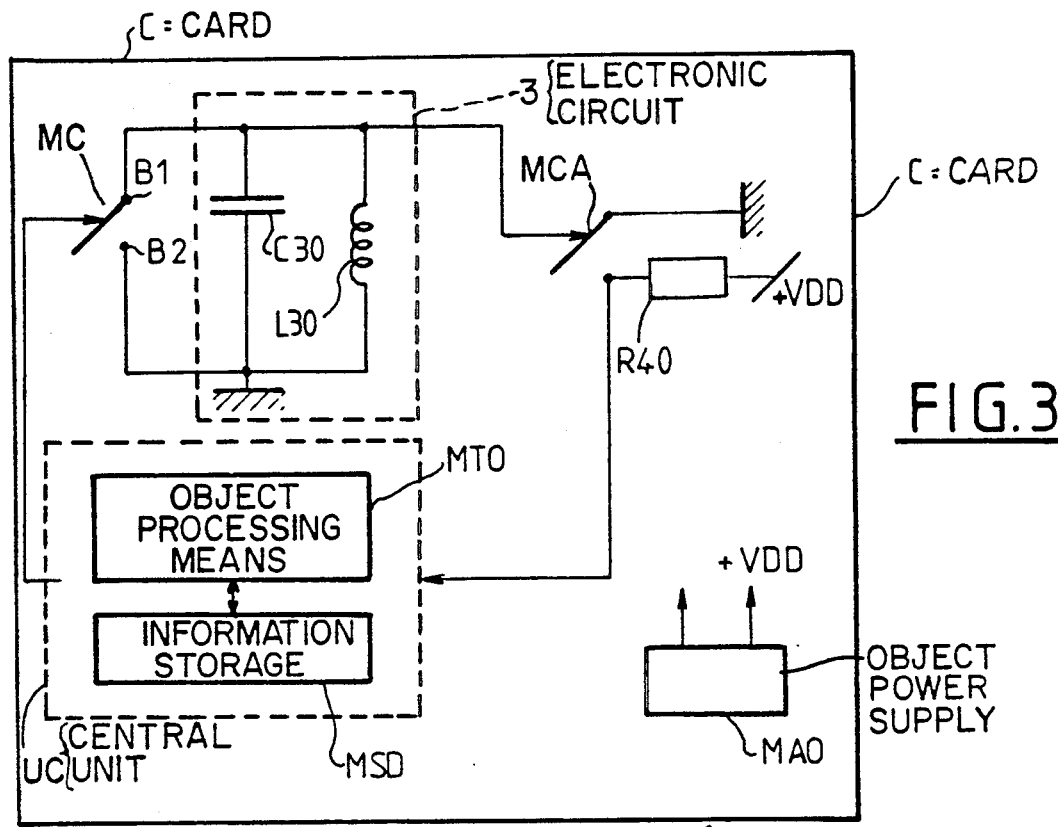
FIG. 3 is a simplified circuit diagram of an embodiment of a portable object of the invention.

As shown in FIG. 3, a card C of the invention is of the same general type as a standard memory card, i.e. its format is about 85 mm by 55 mm, and it includes an electronic circuit 3 possessing an object inductor element L30 whose inductance is substantially equal to 6.7 μH, and whose resistance R30 is substantially equal to 0.5 Ω. This inductor element L30 is intended to be placed in inductive coupling with the station inductor element L10 when the card bearer passes through the gate. A mutual induction coefficient M between these two inductor elements can then be defined, and its value is substantially equal to $4.34 \times 10^{-8}$ H, when the card is in the middle of the gate. Its value increases as the card is brought closer to one of the risers of the gate.

An object capacitor element C30 is connected across the terminals of the inductor element L30, and its capacitance is selected together with the inductance of L30 to constitute a resonant circuit tuned on a frequency $F_R$ which is different from the rest frequency of the terminal oscillator.

The difference between this tuning frequency and the rest frequency may be equal, for example, to the change in frequency induced by the resonant circuit under the most unfavorable conditions, i.e. when the card is placed in the middle of the gate.

However, this resonant circuit continues to remain suitable for inductive coupling with the feedback loop at said rest frequency.

The sensitivity of the station processing means MTS imposes a threshold beyond which this variation in frequency must lie in order to be capable of being analyzed by said means MTS. In this application, the threshold is fixed at 50 kHz, but is may be lower if the sensitivity of the processing means MTS makes that possible, and the elements of the electronic circuit 3 and of the feedback loop are selected and arranged in such a manner that said frequency variation lies above this predetermined threshold.

The electronic circuit 3 is switchable between two states by switching means MC represented diagrammatically as a switch and capable of short circuiting together the two terminals B1 and B2 of the capacitor element C30 (or the inductor element L30). Thus, an active state is defined in which the switch MC is opened and the electronic circuit 3 forms a resonant circuit, and an inactive state in which the switch MC is closed and the respective terminals of the capacitor element C30 and of the inductor element L30 are short circuited to each other and connected to ground.

These switching means MC are controlled by object processing means MTO connected to information storage means MSD. These means MTO and MSD form a portion of a central unit which, in the particular case of a memory card, comprises the microcontroller of the card together with the memories implicitly associated therewith.

One input of the object processor means is suitable for connection either to ground or else to a predetermined voltage +VDD delivered to object power supply means MAO. Which particular connection is used depends on additional switching means MCA controlled by the resonant circuit of the card C, i.e. the electronic circuit 3 when in its active state.

Figure 4:
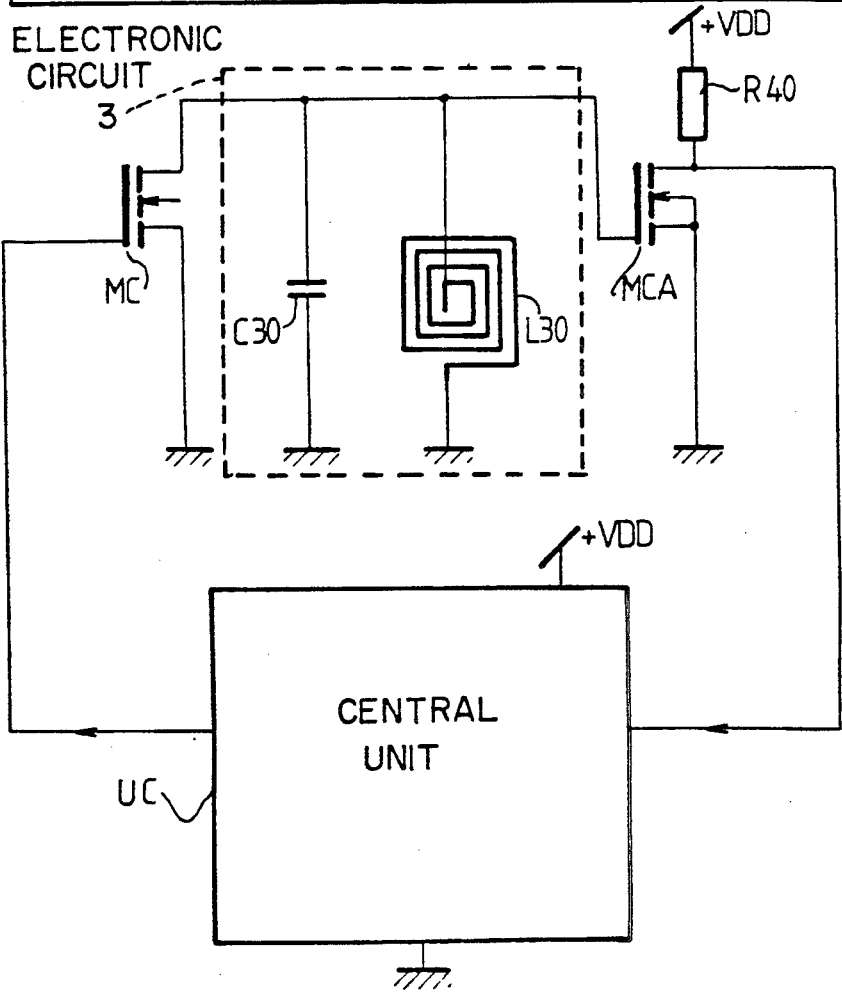
FIG. 4 is a diagram of a particular embodiment of the portable object of FIG. 3.

These various switching means may be constituted by field effect transistors (FETs) as shown in FIG. 4. The transistor MC is of the N channel isolated grid type (N channel MOS), and is more particularly a depletion type transistor. Its grid is connected to the central unit UC; its drain is connected to the terminal of the capacitor element C30 opposite to its terminal connected to ground; and its source is connected to ground, with the substrate being left disconnected or "floating".

The transistor MCA is of the same type as the transistor MC but is enhanced rather than depleted. Its grid is connected to the same terminal of the capacitor element C30 as that which is connected to the drain of the transistor MC. Its substrate and its source are both connected to ground, and its drain is connected firstly to the voltage +VDD via a bias resistor R40, and secondly to an input of the central unit UC.

The object inductor element is constituted by a double-sided printed circuit which is 0.8 mm thick. This thinness means that the layout of the inductive element on the card needs to be optimized in order to minimize stray capacitance between its turns so as to obtain a Q factor for the resonant circuit of the card which is compatible with the desired application. Thus, it is advantageous for the total stray capacitance of the card to be less than 50 pF.

If the inductor element L30 comprises 8 turns SP, for example, then its layout may correspond to the diagram of FIG. 5, i.e. 4 turns may be made in succession on one side of the card and 4 turns on the other side of the card. In this case, 4 elementary stray capacitances Cp are established between pairs of turns and the stray capacitances are substantially in parallel. Consequently the total stray capacitance is substantially equal to the sum of all of the elementary stray capacitances.

In a layout as shown diagrammatically in FIG. 6, each turn of the inductor element runs alternately on the front face and on the back face of the card C. The elementary stray capacitances Cp are then connected substantially in series so that the overall stray capacitance is substantially equal to one fourth of the capacitance of each elementary stray capacitance. This particularly advantageous layout is shown in greater detail in FIG. 7.

In this figure, the lefthand portion illustrates the front face CR of the card and the righthand portion of the rear face CV. Naturally, the portions shown could be attributed the other way round between the front and rear faces. On the front face of the card, reference LB1 designates the first terminal of the object inductor element. This terminal is the starting point of a first "open" turn SP1 which ends at a point PT12 where the electrical conductor passes through the card to extend along the rear face thereof. On the rear face, a second turn SP2 runs from the point PT12 to a through point PT23 situated in the vicinity of the point PT12. The electrical conductor runs on the front face of the card from the point PT23 initially along a rectilinear portion for "closing" the turn SP1, and then along another portion disposed around the outside of the turn SP1 so as to terminate at a through point PT34 situated close to the point PT23, thereby defining a third "open" turn SP3. On the rear face of the card, a fourth turn SP4 runs form this point PT34 around the turn SP2 and ends at a through point PT45.

The path followed by the electrical conductor continues so as to form two further turns SP5 and SP7 on the front face and two turns SP6 and SP8 on the rear face. These turns correspond to through points PT56, PT67, and PT78, and the end point PT88 of the last turn SP8 is likewise a through point. It constitutes the second terminal of the inductor element L30 and it may be connected by an insulated conductor (not shown in FIG. 7) over the front face of the card to a rectilinear conducting portion situated inside the turns so as to constitute a second terminal LB2 facing the terminal LB1.

The other component parts of the card are then located inside the turns provided on the front face thereof.

The operation of the system is described with more particular reference to FIGS. 8 and 9 and to the equations which appear in the appendix, in which the term j designates the square root of $-1$, such that $j^2 = -1$. In all of the equations, each term may be associated with a numerical value. For reasons of simplicity, the references of the various terms are the same as the references designating the components in the system, but in the equations they designate the component values.

When the card electronic circuit 3 is in its active state, i.e. when it forms a resonant circuit tuned to angular frequency $w_R$, the resistance R10 of the station inductor element is increased by a quantity R given by equation (I).

The equivalent circuit for the station amplifier means 2 and the feedback loop 1 in the terminal is given in FIG. 8. Re and Rs respectively designate the input and output resistances of the amplifier means. The complex impedances Z1, Z3, and Z2 are respectively specified by equations (II), (II), and (IV).

For the oscillator OS to be able to oscillate, the product A·B (equations (V), (VI), and (VIII)) must be equal to 1. It is also assumed that the gain G of the amplifier means is sufficient to sustain oscillation. Further, in order to ensure that the additional resistive term R has a significant influence on the feedback loop 1, it is necessary for the ratio of this additional resistive term R over the resistance R10 of the station inductor element (R/R10) to be sufficiently great. In this case, the selected value is about 50. Under such conditions, the impedance Z2 of the station inductor element may be assumed to be equal to the value given by equation (VIII).

To a first approximation, the angular frequency $w_R$ is given by equation (IX). In this equation, $w_O$ designates the angular frequency at rest of the electromagnetic signal across the terminals of the station inductor element (equation (X)), and C designates an overall capacitance value equal to the product of the two station capacitor elements divided by their sum (equation (XI)).

Since the product Re·Rs·C10·C11 is very large compared with the product L10·C (and does occur physically since oscillation takes place), it may be assumed to a first approximation that the angular frequency $w_O$ is given by equation (XII). In this application, a frequency $F_O$ equal to about 6.45 MHz is selected.

When the portable object is not inductively coupled with the terminal, then the operating frequency of the oscillator is its rest frequency $F_O$.

When the card is in the gate, it is necessary for the resonant circuit, although tuned to the frequency $R_R$, to be suitable for inductive coupling with the feedback loop of the oscillator in order to be able to vary the operating frequency thereof.

It is also advantageous for this frequency variation between the inactive state and the active state of the electronic circuit 3 to be as large as possible. It is therefore advantageous for several conditions to be satisfied.

A first condition relates to the input resistance Re of the amplifier means 2. Equation (IX) shows that other things being equal, it is advantageous for the input resistance to be as low as possible, and preferably less than 100 Ω. That is why it is preferable for the transistor T20 to be connected in a common base circuit since this circuit provides a lower input resistance than does a common emitter circuit. In addition, such a circuit provides better temperature stability.

Another condition bears on the product C10·C11 of the two capacitances of the station capacitor elements. The product should be as low as possible in order to obtain as large as possible a variation in frequency when the card is inserted, other things being equal. However, once the angular frequency $w_O$ has been selected, the overall capacitance C is fixed. In this case, and taking account of equation (XI), the product C10·C11 has a minimum value when each of the two values C10 and C11 is equal to twice the overall capacitance.

This result can be seen in the experimental curve of FIG. 9. This curve shows change in frequency ΔF as given by equation (XIII) where $w_R - w_O$ is given to a first approximation by equation (XIV) deduced from equation (IX) by replacing the value C11 by the value given by equation (XV).

It may be observed on this curve that the variation ΔF is at a maximum for C10 equal to 176 pF which corresponds to twice the overall capacitance (88 pF).

This experimental curve which is very close to the theoretical curve is used for adjusting the tuning of the resonant circuit. After placing the card in the middle of the gate (the most unfavorable condition) the value of the object capacitor element C30 is adjusted until the maximum frequency is obtained, which then constitutes the tuned frequency of the resonant circuit. The capacitance C30 is about 88 pF in this case and the tuned frequency i about 6.554 MHz. The frequency variation (54 kHz) is indeed above the threshold SE.

It should be observed here that the frequency variation increases to reach a value of 132 kHz when the card is at 5 cm from one of the risers of the gate. This shows that although the resonant circuit is tuned to the frequency of 6.554 MHz, it nevertheless remains suitable for inductive coupling with the feedback loop even at a working frequency of 6.632 MHz ($F_O = 132$ kHz).

In general, the information to be transmitted from the card to the terminal is stored in the storage means MSD in the form of binary digits (bits, 0 or 1. When transmitting such information, the object processor means MTO control the FET to cause the electronic circuit 3 to take up its active state or its inactive state depending on the value of the current bit. The operating frequency of the oscillator then passes from its rest value $F_O$ to its value $F_R$ or vice versa depending on the binary data transmitted. The station processor means analyze these various changes in frequency and deduce the transmitted information therefrom.

Information is transmitted from the terminal to the card quite simply by applying or not applying a voltage to the terminals of the object inductor element L30. To do this, it is necessary for the electronic circuit 3 to be in its active state, i.e. forming a resonant circuit. Similarly, the information transmitted from the terminal to the card is in the form of a sequence of bits, 0 or 1. Depending on the value of the bit to be transmitted, the station processor means either apply or do not apply a voltage to the terminals of the station inductor elements L10. Consequently, a voltage is induced or not across the terminals of the object inductor element L30. If there is no voltage across the terminals of the element L30, the field effect transistor allows a high state to be applied to the input of the object processor means MTO (input connected to the voltage +VDD). If a voltage is present across the terminals of the element L30, then the field effect transistor MCA connects said input of the object processor means to ground (low state).

It can thus be seen that the field effect transistor MCA is controlled by the resonant circuit and that together with the resonant circuit it forms a portion of the means for receiving data transmitted from the terminal. These reception means can thus be switched between a working state in which they are inductively coupled with the feedback loop of the oscillator (voltage across the terminals of the element L30 and input to the object processor means connected to ground), and a rest state (resonant circuit not inductively coupled with the terminal and the input to the object processor means connected to the voltage +VDD).

Naturally, in this application, the object processor means MTO constitutes means for analyzing the received information and the information is then stored in the form of binary data in the storage means MSD. It would however by possible to have analysis means that are different from the object processor means and for the card to include means for storing received data distinct from its means for storing data to be transmitted.

When the card is not inductively coupled with the gate, the card electronic circuit 3 is in its active state forming a resonant circuit that may be tuned to the working frequency of the terminal oscillator. The reception means are in their rest state, connecting the input of the object processor means to the voltage +VDD. When the card bearer moves into the gate, the reception means pass into their working state, connecting the input of the object processor means to ground. In response to this transition, the card transmits information to the terminal, e.g. an identification number. During this transmission, the electronic circuit 3 takes up either its active state or else its inactive state as a function of the transmitted binary data, and the object processor means inhibit the input thereto in order to avoid taking any account of the position of the switch MDA.

Once all of the useful data has been transmitted, and if the terminal is to transmit information to the portable object, the electronic circuit 3 remains in its active state throughout this transmission and the reception means pass from their rest state to their working state and vice versa as a function of the binary data received from the terminal.

It should be observed here that the card power supply means MAO are used merely for powering the object processor means and for biasing the field effect transistor MCA. No energy is required for the data interchange per se, during transmission in either direction between the card and the terminal. This lower power consumption makes for a long electrical lifetime for the card.

The invention is not limited to the embodiment described above, but extends to any variant, and in particular to the following:
- in some cases, it would be possible during transmission from the card to the terminal for the various elements in the card to be powered from the energy present across the terminals of the object inductor element; and
- the station inductor element may be small in size, particularly when controlling access to a computer terminal. Potential users could be required to place their appropriately equipped cards or badges on an inductive support to enable the terminal to "read" the identification number of the badge prior to authorizing access. This application would also avoid any need for the user to type a password to the screen of the terminal. The person skilled in the art commonly refers to this type of card as a "proximity card".

Naturally some of the means described above may be omitted in variants where they are not of use. This may apply, in particular, to the reception means when a badge is used solely for controlling access to a building. Under such circumstances, the only transmission would be of an identification number from the card to the terminal.

$$R = \frac{M^2 \cdot w_R^2}{R30} \qquad (I)$$

$$Z1 = -\frac{j}{C10 \cdot w_R} \qquad (II)$$

$$Z3 = -\frac{j}{C11 \cdot w_R} \qquad (III)$$

$$Z2 = R10 + R + j \cdot L10 \cdot w \qquad (IV)$$

$$A = \frac{-G}{\frac{1}{Z2} + \frac{1}{Z1' + Z3} + \frac{1}{Rs}} \qquad (V)$$

$$Z1' = \frac{Z1 \cdot Re}{Re + Z1} \qquad (VI)$$

$$B = \frac{Z1'}{Z1' + Z3} \qquad (VII)$$

$$Z2 = R + j \cdot L10 \cdot w_R \qquad (VIII)$$

$$w_R = \qquad (IX)$$

$$\left( w_O^2 + \frac{R^4 - \left(\frac{L10}{C}\right) \cdot R^2 + \left(\frac{L10^2}{Re \cdot C10 \cdot C11}\right) \cdot R}{L10^4 \cdot w_O^2 - L10^2 \cdot R^2} \right)^{\frac{1}{2}}$$

$$w_O = \left( \frac{1}{Re \cdot Rs \cdot C10 \cdot C11} + \frac{1}{L10 \cdot C} \right)^{\frac{1}{2}} \qquad (X)$$

-continued $$C = \frac{C10 \cdot C11}{C10 + C11} \quad \text{(XI)}$$

$$w_O = \left(\frac{1}{L10 \cdot C}\right)^{\frac{1}{2}} \quad \text{(XII)}$$

$$DF = \frac{w_R - w_O}{2\pi} \quad \text{(XIII)}$$

$$w_R - w_O = \frac{R^4 - \left(\frac{L10}{C}\right) \cdot R^2 + \frac{L10^2(C10 - C) \cdot R}{Re \cdot C10^2 \cdot C}}{2 \cdot (L10^4 \cdot w_O^2 - L10^2 \cdot R^2)} \cdot \quad \text{(XIV)}$$

$$\left(\frac{1}{\frac{C10 - C}{Re \cdot Rs \cdot C10^2 \cdot C} + \frac{1}{L10 \cdot C}}\right)^{\frac{1}{2}}$$

$$C11 = \frac{C10 \cdot C}{C10 - C} \quad \text{(XV)}$$

I claim:

1. A system for remote information interchange between a portable object and a station, the system comprising:
    at the station: both an oscillator including a feedback loop having a station inductor element therein and suitable for conferring a working frequency thereto which is variable relative to a rest frequency; and also station processor means connected to the oscillator and capable of processing variations in the working frequency; and
    at the portable object: both an electronic circuit which is switchable between an inactive state and an active state in which it constitutes a resonant circuit tuned to a frequency different from said rest frequency while remaining suitable for inductive coupling with the feedback loop at said rest frequency; and also object processor means capable of switching the electronic circuit as a function of the information to be transmitted to the station, with the variations in the working frequency of the oscillator induced by such switching enabling the station processor means to deduce said information.

2. A system according to claim 1, wherein the electronic circuit elements and the feedback loop elements are selected and arranged so that the frequency variation induced by the resonant circuit is greater than a predetermined threshold.

3. A system according to claim 1, wherein the oscillator comprises amplifier means and an oscillating circuit feedback loop.

4. A system according to claim 3, wherein the feedback loop comprises, in addition to the station inductor element, two station capacitor elements.

5. A system according to claim 3, wherein the input resistance of the amplifier means is low.

6. A system according to claim 4, wherein the oscillator is of the "adapted Colpits" type.

7. A system according to claim 6, wherein the working angular frequency of the oscillator is substantially equal to the reciprocal of the square root of the product of the inductance of the station inductor element multiplied by an overall capacitance which is substantially equal to the ratio of the product of the capacitances of the two station capacitor elements divided by the sum of said capacitances, and wherein the respective capacitances of the two station capacitor elements are selected so as to maximize the frequency variation induced in the oscillator by switching the electronic circuit.

8. A system according to claim 7, wherein the capacitance of teach of the two station capacitor elements is substantially equal to twice said overall capacitance.

9. A system according to claim 6, wherein the amplifier means of the oscillator comprise a common base connected transistor.

10. A system according to claim 6, wherein the amplifier means of the oscillator comprise a common emitter connected transistor.

11. A system according to claim 1, wherein the electronic circuit of the portable object includes an object inductor element and an object capacitor connected to each other in said active state to form the resonant circuit, together with switching means connected to at least one of the two elements and suitable for switching the electronic circuit between its two states.

12. A system according to claim 11, wherein:
    the station inductor element and the object inductor element each exhibits resistance;
    in the active state of the electronic circuit, the resonant circuit induces an additional resistive term in the feedback loop dependant on the mutual induction coefficient between the station inductor element and the object inductor element, and also on the resistance of the object inductor element; and
    the ratio of the additional resistance term divided by the resistance of the station inductor element is greater than a selected value.

13. A system according to claim 12, wherein said value is selected to be about 50.

14. A system according to claim 1, wherein the object inductor element is disposed to impart little stray capacitance to the resonant circuit.

15. A system according to claim 14, wherein the portable object is a card or like object, and wherein the object inductor element comprises an electrical conductor that passes through the card in order to form a succession of turns alternately situated on the front face and on the rear face of the card.

16. A system according to claim 11, wherein the switching means comprise a field effect transistor.

17. A system according to claim 1, including storage means on the portable object for storing the information to be transmitted.

18. A system according to claim 1, wherein the portable object includes electrical power supply means.

19. A system according to claim 18, wherein the portable object further includes reception means for receiving information transmitted from the station to the portable object, said means being switchable as a function of said transmitted information between a working state in which they are inductively coupled with the feedback loop of the oscillator, and a rest state, and analysis means deducing the transmitted information from said switching.

20. A system according to claim 19, wherein the reception means comprise said resonant circuit and additional switching means controlled by the resonant circuit to deliver binary digits to the analysis means as a function of the state in which the reception means are to be found.

21. A system according to claim 20, wherein the additional switching means comprise a field effect transistor.

22. A system according to claim 19, wherein the portable object includes means for storing received information.

23. A system according to claim 19, wherein the analysis means are constituted by the object processor means.

24. A system according to claim 19, wherein the portable object includes common storage means for storing both the received information and the information to be transmitted.

25. A system according to claim 1, wherein the station includes an inductive gate forming the station inductor element.

26. A system according to claim 1, wherein the portable object is of the card, badge, or similar type.

27. A system according to claim 26, wherein the portable object is of the memory card type.

28. A portable object for use with a station by means of inductive coupling, comprising:

an electronic circuit which is switchable between an inactive state and an active state in which it constitutes a resonant circuit tuned to a frequency different from a rest frequency of an oscillator at the station while remaining suitable for inductive coupling with the station; an object processor means capable of switching the electronic circuit as a function of the information to be transmitted to the station, said resonant circuit having characteristics such that, when the electronic circuit is switched into its active state and the object is inductively coupled with the station, variations in the working frequency of the station oscillator are produced for transmitting information between the object and the station.

* * * * *